No. 761,491. PATENTED MAY 31, 1904.
T. HOUBEN.
PNEUMATIC TIRE COVER.
APPLICATION FILED DEC. 15, 1903.
NO MODEL.
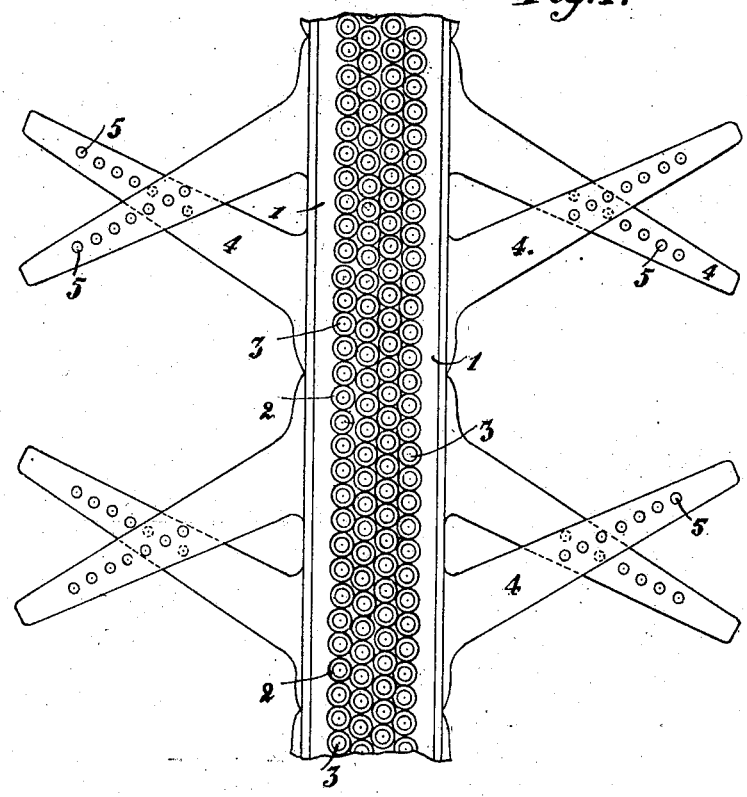
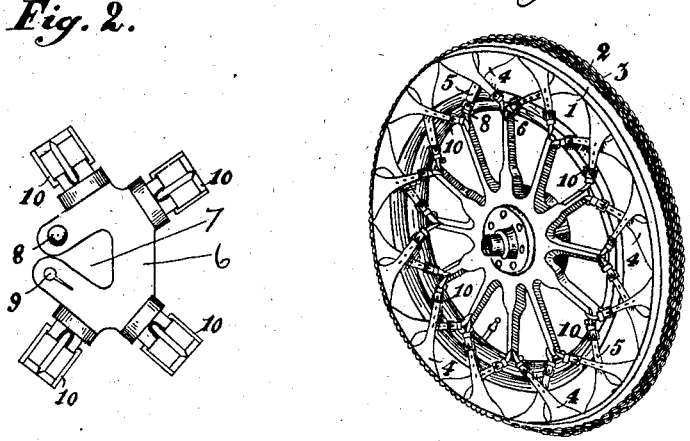

No. 761,491. Patented May 31, 1904.

UNITED STATES PATENT OFFICE.

THEODORE HOUBEN, OF VERVIERS, BELGIUM.

PNEUMATIC-TIRE COVER.

SPECIFICATION forming part of Letters Patent No. 761,491, dated May 31, 1904.

Application filed December 15, 1903. Serial No. 185,310. (No model.)

*To all whom it may concern:*

Be it known that I, THEODORE HOUBEN, manufacturer, a subject of the King of Belgium, residing at Verviers, Belgium, have invented a new and useful Improvement in Covers of Leather for Pneumatic Tires of Motor-Cars and the Like; and I do hereby declare the following to be a full, clear, and exact description of the same.

This invention relates to a cover of leather for pneumatic tires of motor-cars and the like.

In the accompanying drawings, Figure 1 is a partial plan view of the cover with its fastening-flaps. Fig. 2 is a plan view of the piece adapted to a spoke. Fig. 3 is a perspective view of the wheel with its cover.

The cover 1 of crome leather is provided toward its middle with projections or knobs of leather 2 of any desired shape or size. They are placed side by side and fixed by means of steel rivets 3. Hitherto covers or tires for this purpose have been provided with rivets or pieces of iron, which come in contact with the ground. The leather is much more adherent than the rivets and the iron and prevents side slipping or skidding in a perfect manner.

The cover 1 is provided on either side with flaps 4, having holes 5. These flaps are arranged crosswise and there are two of them on each side of the cover for each spoke.

At the upper part of every spoke is adapted a piece of leather 6, having an opening 7 for the passage of the spoke. This opening can be closed by the copper knob 8 engaging in the buttonhole 9. On the four corners of the piece 6 are attached buckles 10, to which are adapted the flaps 4 of the cover 1.

I claim—

A cover for pneumatic tires having flaps secured to each side thereof, said flaps having holes therein, and straps embracing the spokes of the wheel and having buckles secured thereon for engaging the flaps on the cover.

In testimony whereof I have signed this specification in the presence of two subscribing witnesses.

THEODORE HOUBEN.

Witnesses:
J. T. LE COSTE,
JOS. VIORNCE.